US006842237B2

(12) United States Patent
Ausschnitt et al.

(10) Patent No.: US 6,842,237 B2
(45) Date of Patent: Jan. 11, 2005

(54) PHASE SHIFTED TEST PATTERN FOR MONITORING FOCUS AND ABERRATIONS IN OPTICAL PROJECTION SYSTEMS

(75) Inventors: Christopher P. Ausschnitt, Lexington, MA (US); Timothy A. Brunner, Ridgefield, CT (US); Joseph P. Kirk, Chelsea, NY (US); Nakgeuon Seong, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 335 days.

(21) Appl. No.: 10/035,061

(22) Filed: Dec. 28, 2001

(65) Prior Publication Data

US 2003/0123052 A1 Jul. 3, 2003

(51) Int. Cl.[7] ................................................. G01B 9/00
(52) U.S. Cl. ........................................................ 356/124
(58) Field of Search ................................. 356/124–127, 356/515, 5, 21; 359/566–571, 574, 575

(56) References Cited

U.S. PATENT DOCUMENTS

| 5,300,786 A | | 4/1994 | Brunner et al. | |
| 5,805,290 A | | 9/1998 | Ausschnitt et al. | |
| 6,091,486 A | * | 7/2000 | Kirk | 356/124 |
| 6,437,858 B1 | * | 8/2002 | Kouno et al. | 356/124 |
| 6,674,511 B2 | * | 1/2004 | Nomura et al. | 355/55 |

OTHER PUBLICATIONS

SPIE 3697 –"Application of blazed gratings for determination of equivalent primary azimuthal aberrations" –Kirk and Progler –Proceedings SPIE, vol. 3679, pp. 70 –76, Date of Publication 1999, USA.
SPIE 4000 –"Impact of high order aberrations on the performance of the aberration monitor"–Dirksen et al.–Proceedings SPIE, vol. 4000, pp. 9 –17, Date of Publication 2000, USA.
SPIE 4000 –"In–situ measurement of lens aberrations" –Farrar et al.–Proceedings SPIE, vol. 4000, pp. 18 –29, Date of Publication 2000, USA.

* cited by examiner

Primary Examiner—Michael P. Stafira
(74) Attorney, Agent, or Firm—Todd M. C. Li

(57) ABSTRACT

A method is described for determining lens aberrations using a test reticle and a standard metrology tool. The method provides test patterns, preferably in the form of standard overlay metrology test patterns, that include blazed gratings having orientation and pitch selected to sample desired portions of the lens pupil. The method measures relative shifts in the imaged test patterns using standard metrology tools to provide both magnitude and sign of the aberrations. The metrology tools need not be modified if standard test patterns are used, but can be adapted to obtain additional information. The test reticles may be formed with multiple test patterns having a range of orientations and pitch in order to compute any desired order of lens aberration. Alternatively, single test patterns may be used to determine both the magnitude and sign of lower order lens aberrations, such as defocus or coma.

17 Claims, 12 Drawing Sheets

(C)

(B)

(A)

PHASE SHIFTED TEST PATTERN FOR MONITORING FOCUS AND ABERRATIONS IN OPTICAL PROJECTION SYSTEMS

FIELD OF THE INVENTION

The present invention generally relates to testing and characterization of lenses and, more particularly, to the quantitative measurement of aberrations in lithographic lenses.

BACKGROUND OF THE INVENTION

In various high performance optical imaging systems, A very large scale integrated (VLSI) complementary metal oxide semiconductor (CMOS) chip is manufactured on a silicon wafer by a sequence of material additions (i.e., low pressure chemical vapor depositions, sputtering operations, etc.), material removals (i.e., wet etches, reactive ion etches, etc.), and material modifications (i.e., oxidations, ion implants, etc.). These physical and chemical operations interact with the entire wafer. For example, if a wafer is placed into an acid bath, the entire surface of the wafer will be etched away. In order to build very small electrically active devices on the wafer, the impact of these operations has to be confined to small, well defined regions.

Lithography in the context of VLSI manufacturing of CMOS devices is the process of patterning openings in photosensitive polymers (sometimes referred to as photoresists or resists) which define small areas in which the silicon base material is modified by a specific operation in a sequence of processing steps. The manufacturing of CMOS chips involves the repeated patterning of photoresist, followed by an etch, implant, deposition, or other operation, and ending with the removal of the expended photoresist to make way for the new resist to be applied for another iteration of this process sequence.

The basic lithography system consists of a light source, a stencil or photo mask containing the pattern to be transferred to the wafer, a collection of lenses, and a means for aligning existing patterns on the wafer with patterns on the mask. The aligning may take place in an aligning step or steps and may be carried out with an aligning apparatus. Since a wafer containing from 50 to 100 chips is patterned in steps of 1 to 4 chips at a time, these lithography tools are commonly referred to as steppers. The resolution, R, of an optical projection system such as a lithography stepper is limited by parameters described in Raleigh's equation:

$$R = k\lambda/NA,$$

where $\lambda$ represents the wavelength of the light source used in the projection system and NA represents the numerical aperture of the projection optics used. "k" represents a factor describing how well a combined lithography system can utilize the theoretical resolution limit in practice and can range from about 0.5 down to about 0.3 for standard exposure systems. The highest resolution in optical lithography is currently achieved with deep ultra violet (DUV) steppers operating at 248 nm. Wavelengths of 365 nm are also in widespread use and 193 nm wavelength lithography is becoming commonplace.

In production optical lithography, it is necessary to measure lens aberrations (e.g. localized shifts of focus or other imaging imperfections from the optical system) in order to ensure that the tools used in production will meet the desired quality requirements. Lens aberrations include defects such as defocus, astigmatism, coma, etc. It is preferable to obtain such measurements without actually producing product. During manufacture of such systems, lens aberrations are measured using techniques such as Phase Measuring Interferometry (PMI), and the optical system is adjusted until it is within tight specifications according to the PMI. If the lens aberrations are well-understood, the optical system can be made to compensate to some extent for such errors. However, after the optical system is complete, it is very difficult and uncommon to use PMI in the field to measure lens aberration. Additionally, lens aberrations may change over time, so that the corrections for lens aberrations measured during manufacturing become obsolete. Slight changes in lens shape or relative location become more significant at very short wavelengths, and for high NA optical systems. Therefore, at the level of performance currently required of lens systems for optical lithography, a robust in-situ method for simultaneous measurement of coma, astigmatism and higher order aberration is needed to support maintenance of optical lithography tool performance. A number of aberration metrology methods are known in the art.

For example, Dirksen et al. ("Impact of high order aberrations on the performance of the aberration monitor," Proceedings of SPIE Vol. 4000 (2000), pp. 9–17) describes an in-line aberration measurement method, in which a circular pattern made of a pure shifter is imaged onto a photoresist layer. The presence of lens aberrations will make the printed pattern non-circular. The analysis uses a scanning electron microscope (SEM) to collect images and measure variations in critical dimension (CD). Since aberrations may be expressed mathematically as a series of polynomials, the SEM measurements are used to determine the coefficients of the polynomial series, thus providing a method of measuring the aberrations of the lens system. However, SEM measurements are not part of standard production operations and this method would require custom metrology equipment.

Farrar et al. ("In-situ measurement of lens aberrations," in Proceedings of SPIE Vol. 4000 (2000), pp. 18–29) describes method for characterization of both the illuminator and lens by means of a diagnostic reticle. This method incorporates a Shack Hartman interferometer into a special reticle. This reticle is used to print a special pattern onto the photoresist, which is in turn measured using standard optical overlay metrology tools. One disadvantage of this method is that exposure times are much longer (up to 50 times) than normal exposure times. These specialty masks are non-standard, and susceptible to fabrication errors and misalignments.

Kirk et al. (U.S. Pat. No. 6,091,486 and in SPIE Vol. 3697 (1999), p. 70) describes an in-situ method of characterizing lens aberration by using a blazed grating, such that the interference pattern is asymmetric in amplitude. The zeroth and first order (asymmetric) diffraction components are imaged at different angular orientations through a range of focus to create a matrix of imaged areas on a resist where each image corresponds to a different combination of orientations of the blazed grating and focus conditions. The relief of each of the exposed areas within the matrix are compared using a dark field microscope system, and the variation in aberration is computed. However, this method requires the use of a customized microscope and special software for data acquisition.

In view of the foregoing discussion, there is a need to provide for a method for characterizing lens aberrations using standard production methods and equipment, using normal exposure dose and a single exposure set of data.

SUMMARY OF THE INVENTION

An objective of the present invention is to address the above-described need by providing a method for measuring lens aberration using a standard metrology tool.

The present invention also has the objective of providing test reticles and test patterns to be formed on test reticles that can be used with standard metrology tools to measure lens aberration.

A further objective of the present invention is to provide a method and a single test pattern for measuring focus aberration using a standard metrology tool.

Another objective of the present invention is to provide a method and a single test pattern for measuring coma aberration using a standard metrology tool.

Yet another objective of the present invention is to provide a method and test patterns for determining lens aberrations of any order using standard metrology equipment.

Accordingly, the present invention provides a method for measuring lens aberration, the method comprising:

providing a reticle having a test pattern, said test pattern having a first feature and a second feature, said first feature comprising a blazed grating capable of forming an asymmetric pattern of illumination energy passing therethrough, said asymmetric pattern rotationally oriented in a first direction;

exposing a photosensitive material to illumination energy passing through said first and second features to form a first feature image and a second feature image, respectively;

measuring a relative location of said first feature image with respect to said second feature image; and computing a lens aberration parameter in accordance with said relative location.

The blazed gratings of the present invention are preferably formed to diffract a single beam. The test patterns used with in accordance with the present invention are preferably in the form of standard overlay metrology test patterns, such as box-in-box patterns, although the invention is not limited to the use of box-in-box patterns, or other standard overlay metrology test patterns. The use of standard metrology test patterns has the advantage that standard metrology tools may be used to determine the relative shift of the test patterns in the presence of aberrations, without significant, if any, alteration in the tool or software.

Test patterns in accordance with the present invention may be adapted to provide measurement of lower order aberration properties, such as defocus or coma, in a single test pattern. More generalized test patterns can be formed that sample specific portions of the lens pupil depending on the orientation and pitch of the blazed gratings selected. Thus, it is possible to form test reticles using a range of orientations and pitches, and combining the relative shifts in each test pattern to determine any arbitrary order of lens aberration, for example, by using the relative shift information to compute Zernike coefficients.

The novel features believed to be characteristic of this invention are set forth in the appended claims. The invention itself, however, as well as other objects and advantages thereof, may be best understood by reference to the following detailed description of an illustrated preferred embodiment to be read in conjunction with the accompanying drawings.

DESCRIPTION OF THE PREFERRED EMBODIMENTS

In the following descriptions of the preferred embodiments of the invention, a method is described for measuring lens aberrations using test patterns designed in accordance with the invention to be using in conjunction with standard metrology equipment. It will be appreciated that this is intended as an example only, and that the invention may be practiced under a variety of conditions and using a variety of layouts and design constraints.

Figure 1:
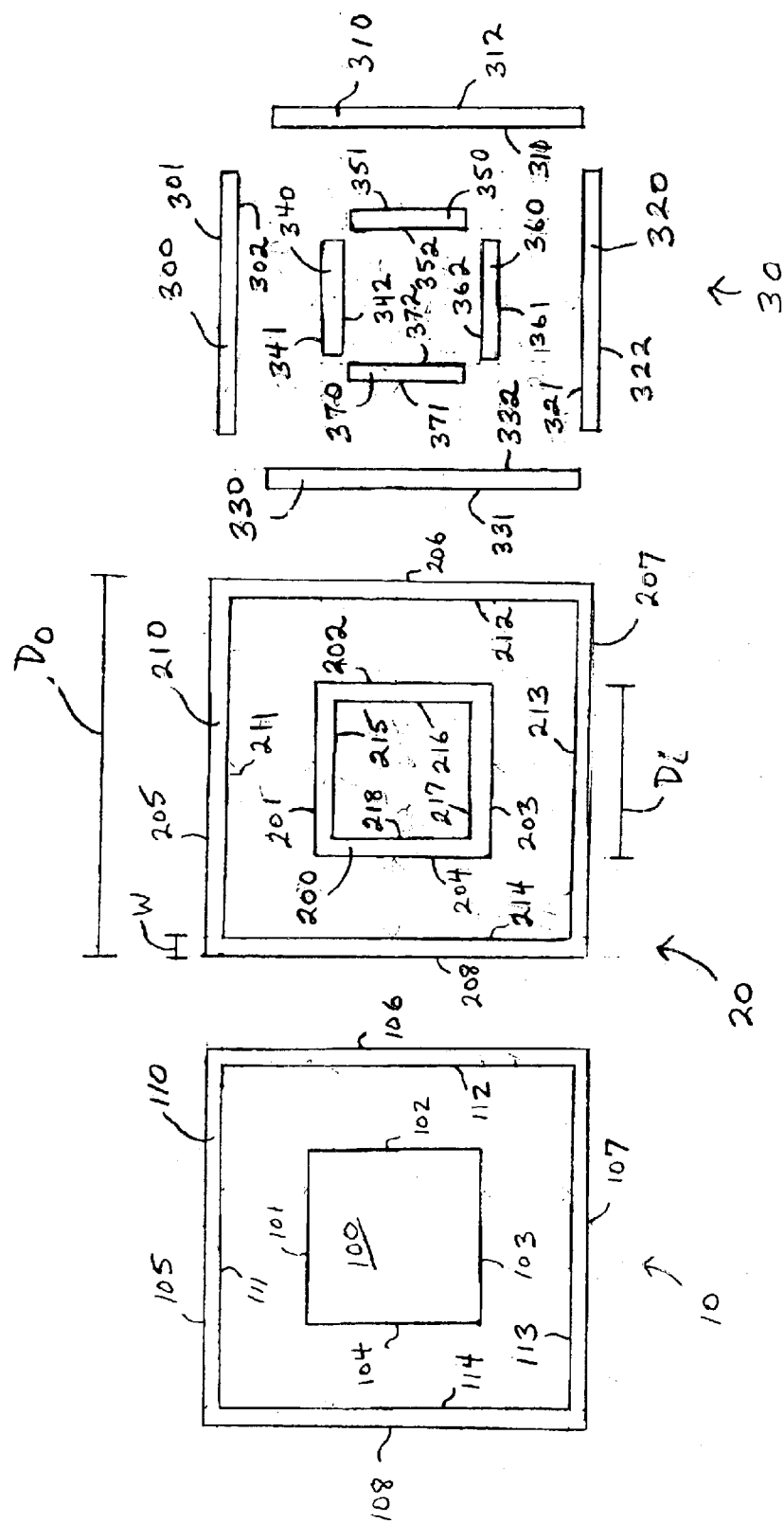
FIG. 1 illustrates typical box-in-box patterns.

In production lithography, it is standard practice to ensure overlay registration of each level deposited on a wafer by measuring the positioning of a test pattern on a resist layer relative to a test pattern printed on the underlying layer. Test patterns are also used to measure other lithographic parameters such as bias in the printed critical dimensions. Tools to perform overlay measurement and other metrology measurements are standard equipment in production lithography. Many test patterns for performing overlay alignment measurements or and other metrics of metrology are known in the prior art. FIG. 1 illustrates some examples of common test patterns used in overlay metrology. A first test pattern 10 includes a nominally square frame feature 110 enclosing a nominally square feature 100. In a typical application, the frame feature 110 would be printed on a wafer layer in the kerf region, which is outside the chip product area. In order to measure overlay registration of a subsequent layer, a nominally square feature 100 is imaged on a photoresist layer patterned for printing the next level layer over the existing printed layer. The square feature 100 is designed to be nested in the center of frame feature 110 for correct overlay registration of the two layers. In a typical overlay metrology procedure, if the relative positioning of the overlay features violate the registration tolerances, then the second layer resist can be washed off and formed again until the registration tolerances rules are satisfied. In the example using test pattern 10, the edges 101, 102, 103 and 104 of the nominally square feature 100 are detected by a standard metrology tool, which then computes the center location of feature 100. Similarly, the inside edges 111, 112, 113 and 114 and the outside edges 105, 106, 107 and 108 of the frame feature 110 are detected, and the center location of the nominally square feature 110 can be computed and compared to the center location of the nested feature 100. If the two center locations are not within a prescribed registration tolerance, the resist layer can be washed off and re-applied.

An alternative test pattern 20 also has a frame feature 210 similar to the frame 110 of test pattern 10, but the inner feature 200 is a smaller frame having inside edges 215, 216, 217 and 218 as well as outside edges 201, 202, 203 and 204. The outer frame 210 has inner edges 211, 212, 213 and 214 and outer edges 205, 206, 207 and 208. One of the frame features will be printed on the top layer of a wafer, and the other frame feature will be formed on a resist layer formed on the top layer of the wafer, the two frames nominally positioned to be nested one within the other. As before, the relative overlay registration of two layers is commonly determined by detecting the positions of the outer edges 205, 206, 207 and 208 and inner edges 211, 212, 213 and 214 of the outer frame feature 210, and the outer edges 201, 202, 203 and 204 and inner edges 215, 216, 217 and 218 of the inner frame 200, and then computing the center positions of the frames 200, 210. As previously described, typically the center positions are compared to ensure overlay of the patterned resist layer within a registration tolerance of the underlying top layer.

A third test overlay test pattern 30 has two outer vertical features 310, 330 and two outer horizontal features 300, 320. Test pattern 30 also includes two inner vertical features 350, 370 and two inner horizontal features 300, 320. As described above, a typical method of determining overlay registration would include printing a set of two vertical and two horizontal features on a wafer layer, for example, the four outer features 300, 310, 320 and 330 nominally arranged in a square-shaped pattern. Alternatively, the four inner features could be first printed on the wafer. The other set of four features would then be formed, nominally in a square-shaped pattern nested with the first set of features, on an overlying resist layer, which in this example would be the four inner features 340, 350, 360 and 370. As described above, the metrology tool will then detect the edges 301, 302, 311, 312, 321, 322, 331 and 332 of the four outer features 300, 310, 320 and 330 and compute the center position of the nominally square-shaped outer pattern. Similarly, the edges 341, 342, 351, 352, 361, 362, 371 and 372 of the four inner features 340, 350, 360 and 370 are detected and the center position of the nominally square-shaped inner pattern is computed. The relative positions of the computed center locations of the inner and outer patterns are compared to the registration tolerance, and the resist layer is corrected if necessary.

The three types of test patterns 10, 20 and 30 are all commonly referred to as "box-in-box" test patterns. The dimensions of a typical box-in-box pattern at the image plane has outer frame, such as feature 110, 210 or the outer pattern formed by outer features 300, 310, 320 and 330, has edge lengths Do on the order of tens of microns, for example about 20 $\mu$m, and thickness W on the order of microns, for example, about 2 $\mu$m. A typical inner box feature such as inner feature 100, inner frame 200 or inner square pattern formed by features 340, 350, 360 and 370, have edge lengths Di that fit comfortably within the outer feature, for example about 10 $\mu$m. The widths of features such as 200, 340, 350, 360 or 370 are similar to the outer feature widths, on the order of microns, for example about 2 $\mu$m. (The images when projected through a reticle are reduced on the wafer plane. For example, a typical reticle may be used to project a 4× reduction. Thus a 2 $\mu$m width image will be represented by a 8 $\mu$m width feature on a 4× reticle.) The common characteristics of box-in-box test patterns is the presence of horizontal and vertical outer and inner features having parallel edges. Standard metrology tools are typically set up to detect the edges of such patterns, and thereby compute the relative center positions of features formed in different levels. Other overlay test patterns may also be devised. The present invention provides a method for determining lens aberration by providing test reticles in the form of overlay test patterns, such as box-in-box patterns, whose edge positions can be measured using standard metrology tools. A test reticle in accordance with the present invention incorporates overlay test patterns that have blazed gratings of different orientations as in Kirk et al. (U.S. Pat. No. 6,091,486), but does not require the use of customized equipment to obtain aberration measurements.

Figure 2:
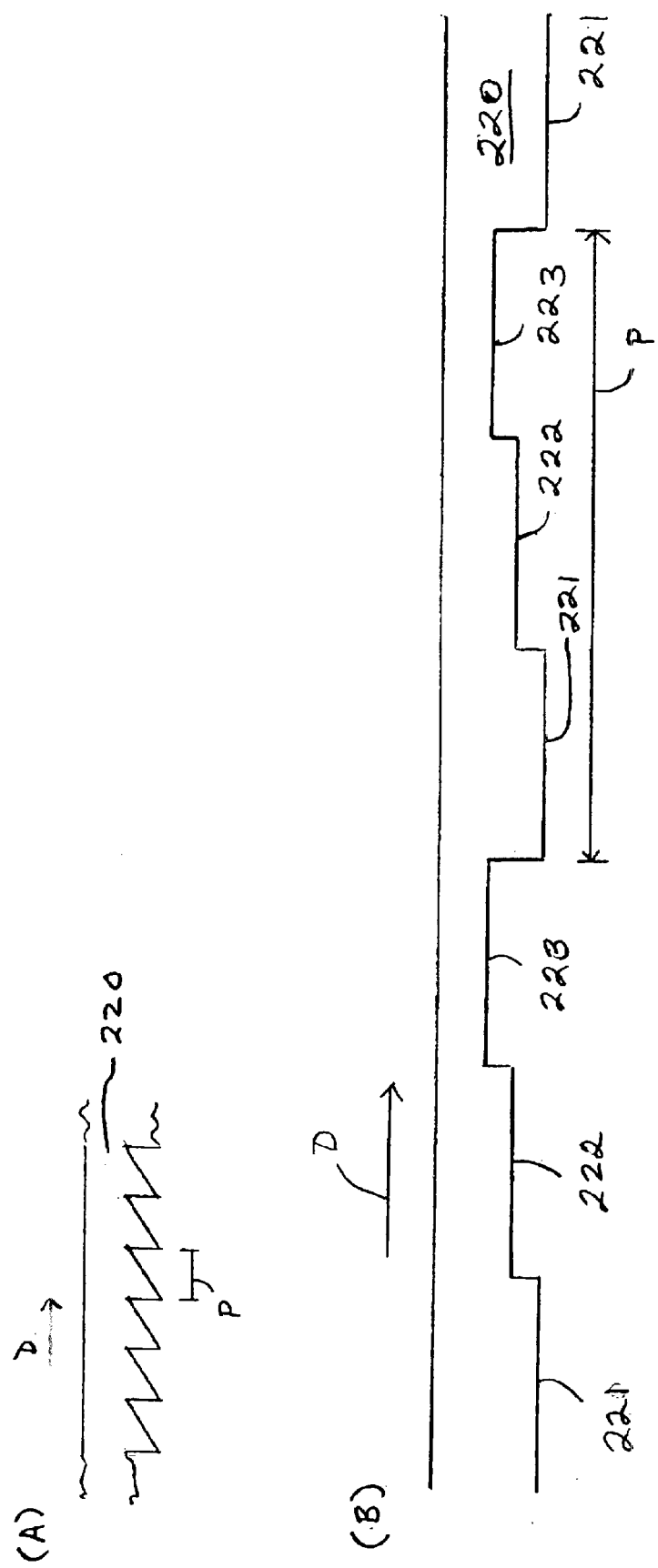
FIG. 2 illustrates a cross-section view of a typical blazed grating.
Figure 3:
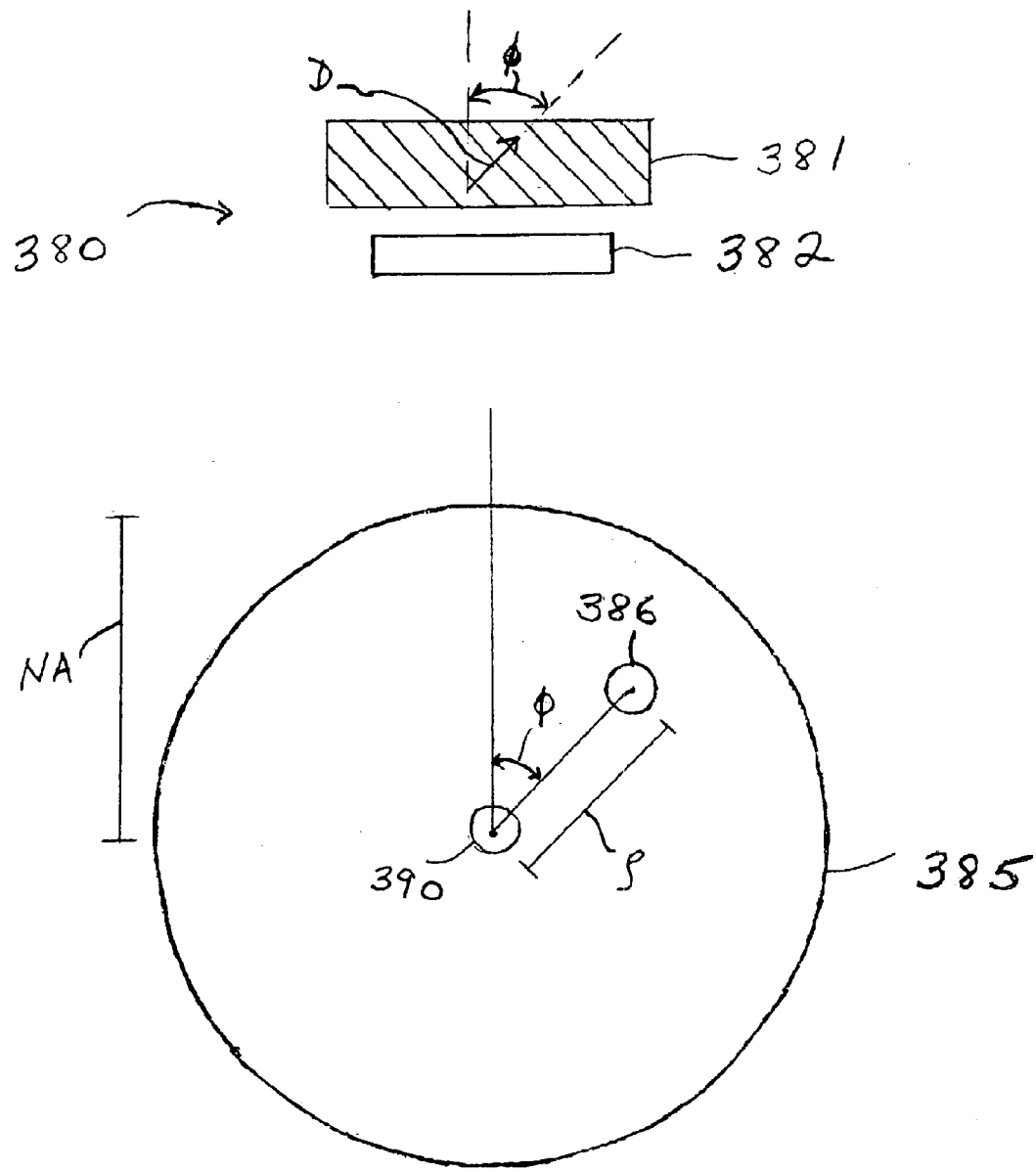
FIG. 3 illustrates a plan view of a dark field test pattern including a blazed grating, and the resulting diffraction pattern represented on a pupil diagram.

Blazed gratings are known in the art, and refer to gratings which have asymmetric sawtooth patterns in a mask substrate 220 that act as prisms repeated at a given pitch P, as illustrated in FIG. 2(A) which shows a cross-section of a blazed grating. As a practical matter, such blazed gratings are typically implemented using a stepped pattern as illustrated in FIG. 2(B), showing a cross-section of a blazed grating in a mask substrate 220. The regions 221, 222, 223 are formed so that the relative thickness of the substrate 220 in each region results in a desired phase shift of the transmitted illumination energy. The interference pattern from the blazed grating is asymmetric in amplitude and the relative phases of the stepped pattern act effectively as a prism to asymmetrically illuminate a portion of the lens pupil. The azimuthal direction of the asymmetric interference pattern is indicated by the arrow D, and refers to the azimuthal position of the interference pattern formed on the pupil of the lens. Referring to FIG. 3, a plan view of a portion of a test pattern 380 formed in a dark field reticle is illustrated having an outer horizontal feature 381 and an inner horizontal feature 382, where both features 381, 382 transmit illumination energy and are surrounded by a dark field, such as opaque chrome. The outer horizontal feature 381 contains a blazed grating having an angular orientation $\phi$ and direction D and a pitch P (see FIG. 2). Here, grating pitch P is specified as the pitch as it would be projected on the image plane. On a reticle, the dimensions of features are typically larger than the intended image by a given factor, for example, by 4×. The grating is designed so that the illumination energy transmitted through the reticle 380 would be diffracted into an asymmetric pattern. This diffraction pattern can be represented on a pupil diagram 385, in which NA is the numerical aperture of the lens pupil. In the blazed gratings used in the method of Kirk et al. (U.S. Pat. No. 6,091,486) are designed to form a diffraction pattern that contains energy corresponding to the zeroth order beam 390 in the center of the pupil diagram 385 and a +1 order beam 386 corresponding to propagation direction $\theta$ (see FIG. 5) so that the +1 order beam 386 is located on the pupil diagram 386 at an offset radius of $\rho=\sin(\theta)$. The offset radius $\rho$ is inversely proportional to the pitch P of the grating, according to:

$$\rho = \frac{\lambda m}{P},$$

where $\lambda$ is the wavelength of the illumination energy and m is the diffraction order. For example, using a wavelength $\lambda$ of 193 nm, the grating pitch may range from about 300 nm to about 600 nm to keep the +1 order beam within NA of the lens pupil. Note that a grating with a pitch of about 360 nm can be repeated about 5 times within a width of 2 microns. For the purposes of the present invention, simulations have shown that the blazed grating is preferably designed to diffract a single beam, in other words, so that all the energy is diffracted into the +1 order, but other asymmetric blazed grating designs may be used. As an example, referring to FIG. 2, a grating having regions 221 formed to provide 0° phase shift, regions 222 formed to provide 120° phase shift, and regions 223 formed to provide 240° degree phase shift, would result in an interference pattern having a single beam. Thus, it is possible to design a blazed grating that tests specific regions of the lens pupil by adjusting both the orientation and pitch of the grating.

The present invention takes advantage of existing edge detection and center location computation capabilities of standard metrology tools by using test reticles that incorporate blazed gratings into standard metrology test patterns. The test patterns are designed with a range of grating orientation and pitches in order to test different portions of the lens pupil. Lens aberrations are determined in accordance with the present invention by detecting edges of the test patterns, and computing the relative shift of the center of the patterns using standard metrology tools.

Figure 4:
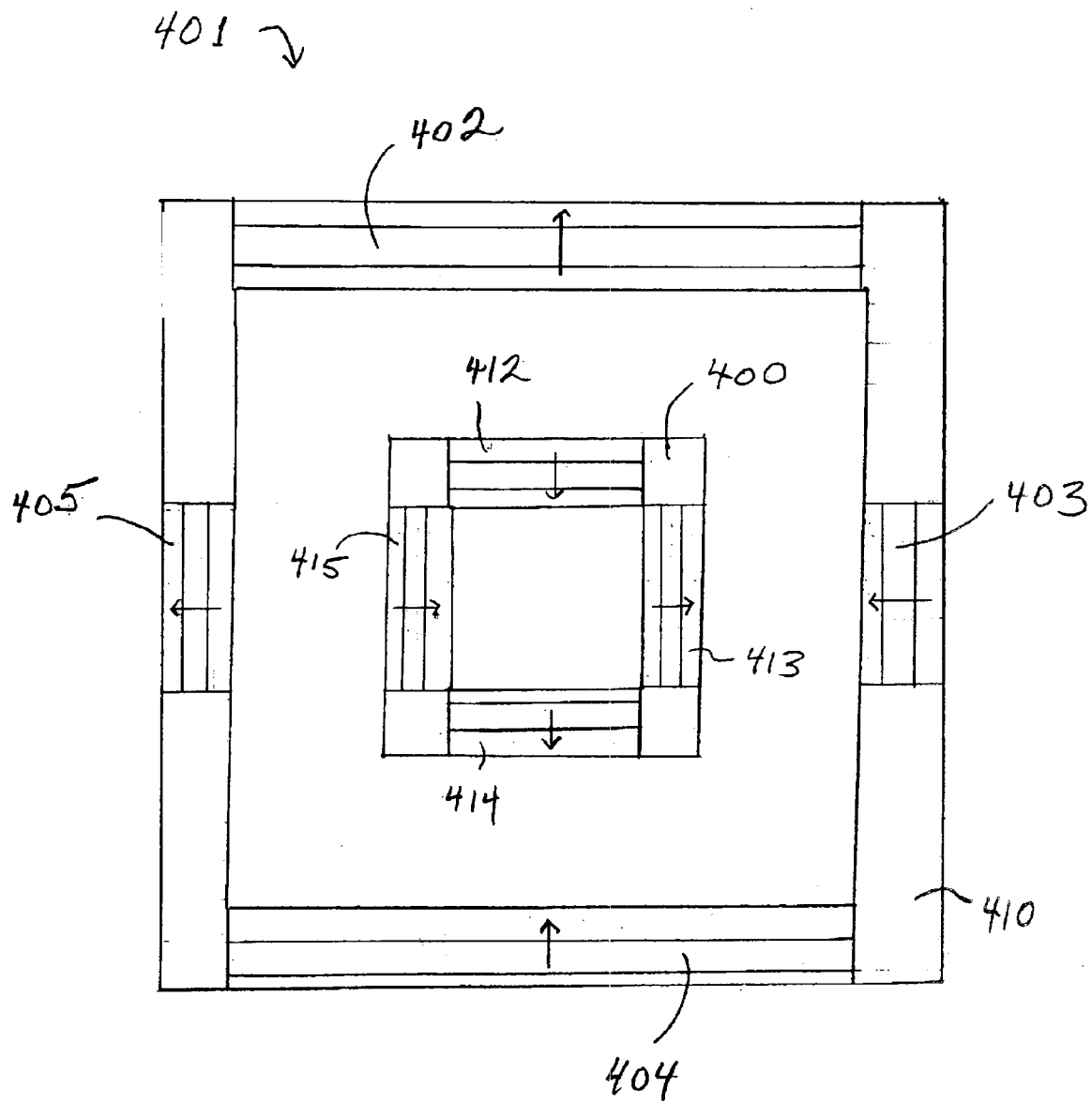
FIG. 4 illustrates a focus-sensitive dark-field test pattern in accordance with the present invention.

Referring to FIG. 4, one embodiment in accordance with the present invention is illustrated that has particular sensitivity to focus. The dark field test pattern 401 is formed in a test reticle in the configuration of a box-in-box pattern similar to pattern 20 from FIG. 1. The focus sensitive test pattern 401 has an outer feature 410 with a horizontal outer blazed grating segment 402 at the top, a horizontal outer blazed grating segment 404 at the bottom, a vertical outer blazed grating segment 403 on the right and a vertical outer blazed grating segment 405 on the left. Within the area encompassed by the outer feature 410 is an inner feature 400 having a top horizontal inner blazed grating segment 412, a bottom horizontal inner blazed grating segment 414, a right vertical inner blazed grating segment 413, and a left vertical inner blazed grating segment 415. As discussed above, the blazed gratings are preferably formed to diffract a single beam into the lens pupil, although other asymmetric diffraction patterns would be suitable. The outer vertical blazed grating segments 403 and 405 contain blazed gratings oriented so that the beam is diffracted through a left portion of the pupil, while the inner vertical blazed grating segments 413 and 415 contain blazed gratings oriented so that the beam is diffracted through a right portion of the pupil. The orientations of the resulting diffraction patterns are indicated by the arrows in FIG. 4. The outer horizontal blazed grating segments 402 and 404 contain blazed gratings oriented so that the beam is diffracted through an upper portion of the pupil, while the inner horizontal blazed grating segments 412 and 414 contain blazed gratings oriented so that the beam is diffracted through a bottom portion of the pupil, as indicated by the arrows in FIG. 4. In accordance with the present invention, the test pattern is used to form an image on a resist layer, and the resulting image edges are detected by a standard overlay metrology tool, and the resulting center positions are computed. The relative shifts between the center of printed image of inner feature 400 and the center of the printed image of the outer feature 410 provide information about the magnitude and sign of focus aberrations. Relative shifts between the inner and outer features of this box-in-box pattern can be easily measured using standard metrology tools without significant changes in software.

Figure 5:
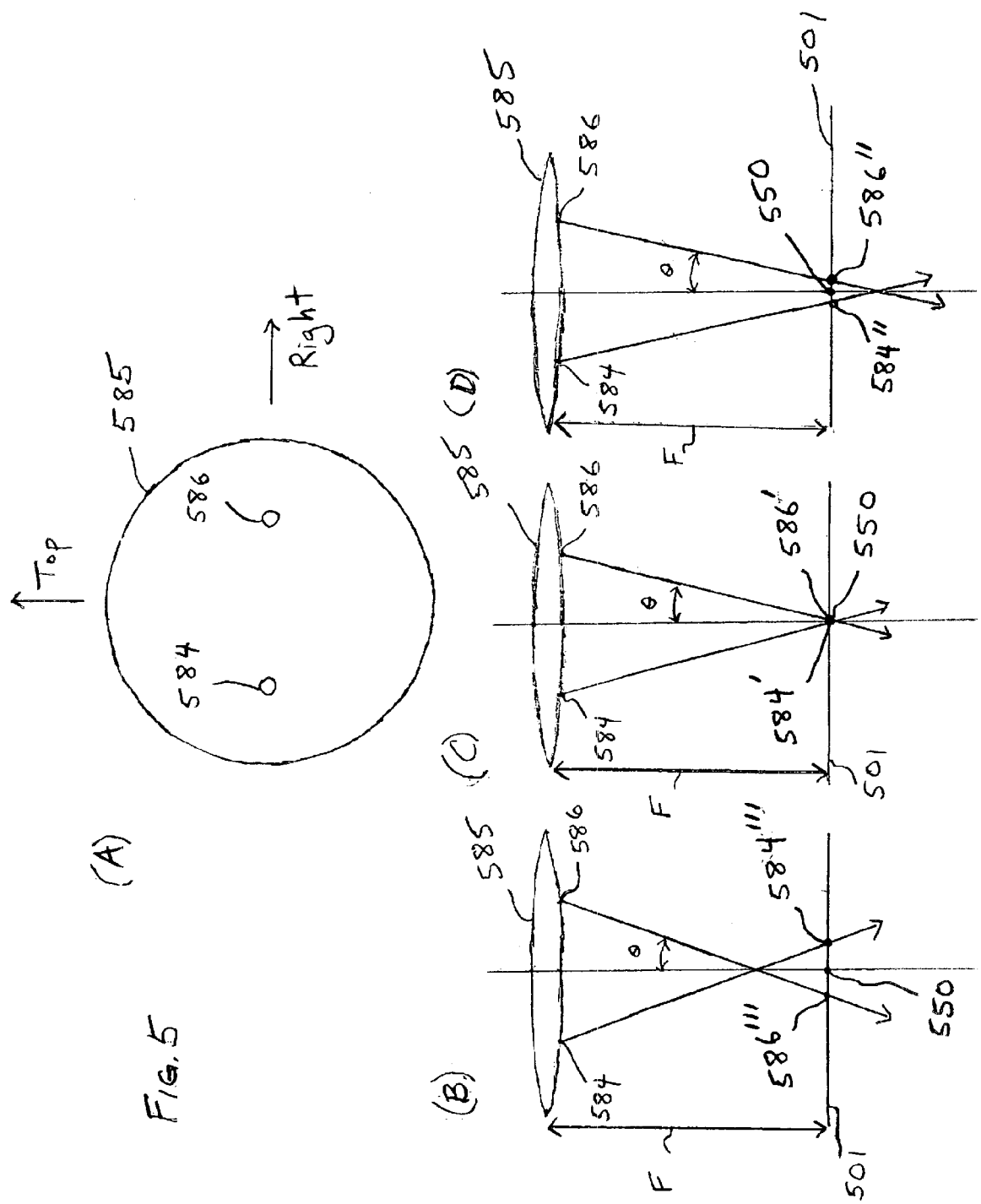
FIG. 5 illustrates the effect of defocus on a diffracted beam.

The relative shift due to focus aberration can be understood by reference to FIG. 5. FIG. 5A illustrates a pupil diagram 585.

A right-oriented blazed grating having a pitch P, such as those formed in vertical elements 413 and 415, may be formed to diffract a single beam 586 to illuminate a right-hand portion of the lens pupil. Similarly, a left-oriented blazed grating having the same pitch P, such as those formed in vertical elements 403 and 405, may be formed to diffract a single beam 584 to illuminate a left-hand portion of the pupil. If there are no focus aberrations in the lens, both beams 584 and 586 will be focused at a nominal focal distance F on to the image plane 501 at points 584' and 586', respectively, and coincide with the center point 550, as illustrated in FIG. 5C, showing a side view of the lens pupil 585 and image plane 501. However, the presence of focus aberrations may cause the beams to focus at a distance shorter or longer than the nominal focal distance F. If the focus distance is shorter than F, the right-hand oriented beam 586 will strike the image plane at a point 586''' to the left of the center point 550 and the left-hand oriented beam 584 will strike the image plane at a point 584''' to the right of center point 550, as illustrated in FIG. 5B. This type of defocus will be referred to hereinafter as "minus defocus," meaning that the defocus has caused the image to shift in a direction opposite the orientation of the grating. On the other hand, if the focus aberrations result in a focus depth longer than the nominal focal distance F, the right-hand oriented beam 586 will strike the image plane at a point 586'' to the right of center point 550, and the left-hand oriented beam 584 will strike the image plane at a point 584'' to the left of center point 550, as illustrated in FIG. 5D. This type of defocus will be referred to hereinafter as "plus defocus," meaning that the defocus has caused the image to shift in the same direction as the orientation of the grating. Thus, a shift of inner feature 400 relative to the outer feature 410 of the test pattern 401 can provide information about both the magnitude and sign of focus aberrations.

Figure 6:
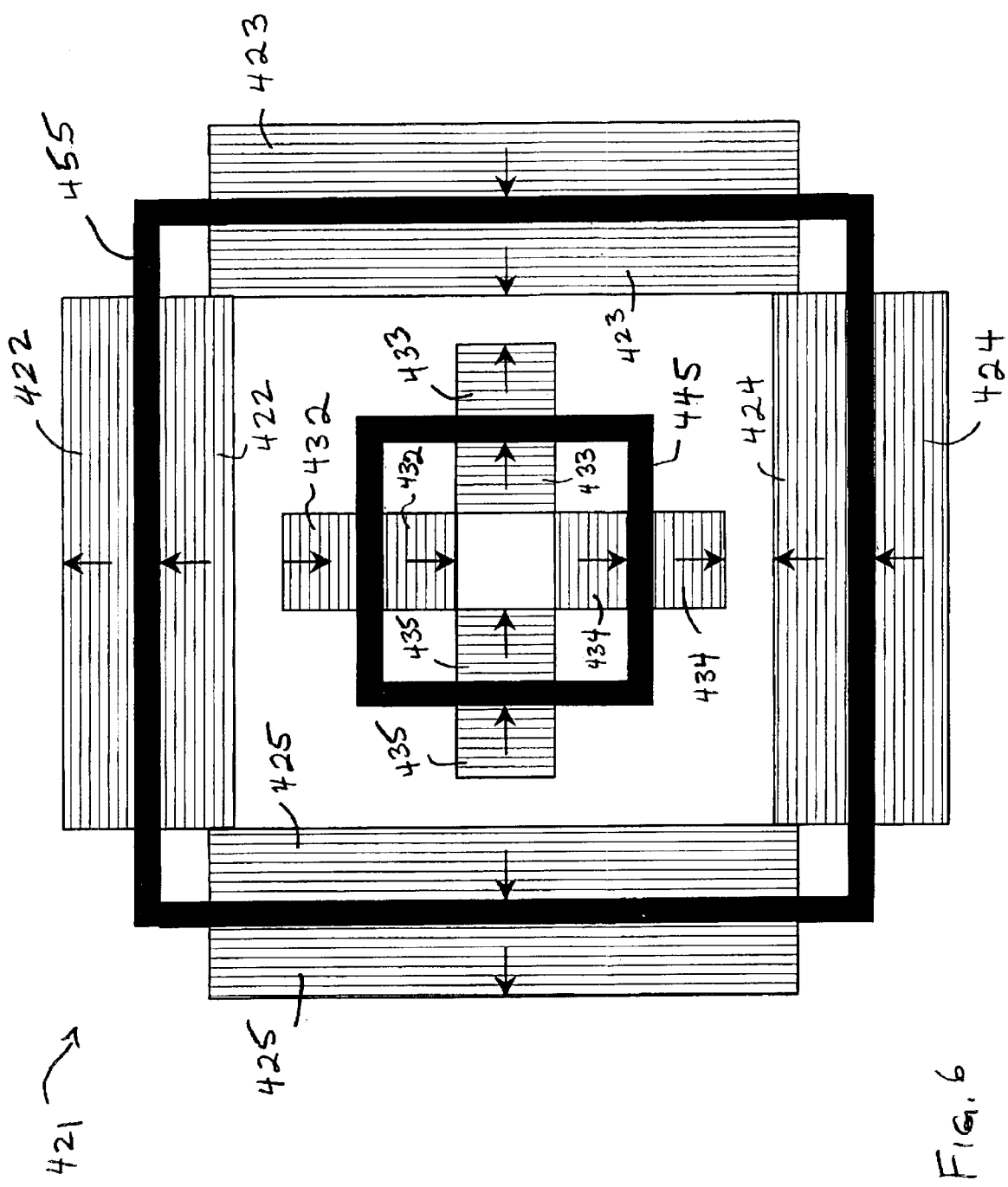
FIG. 6 illustrates a plan view of a focus-sensitive light field test pattern in accordance with the present invention.

A light field test reticle may also be formed in accordance with the present invention, as illustrated for the case of a focus sensitive pattern 421 illustrated in FIG. 6. In a light field reticle, a box-in-box pattern 421 includes an outer square frame feature 455 and an inner square frame feature 445 which would opaque regions typically formed by chrome. The surrounding areas will transmit illumination. Disposed on opposing sides of the vertical portions of outer feature 455 are blazed grating regions 425 and 423, oriented to diffract into a left-hand portion of the pupil. Disposed on the opposing sides of the vertical portions of inner feature 445 are blazed grating regions 435 and 433, oriented towards the right-hand side of the pupil. Thus, in the presence of focus aberrations, the vertical feature edges will be shifted either to the left or right depending on the sign of the focus aberrations, and there will be a horizontal shift of the center of outer feature 455 relative to the center of inner feature 445, as discussed above. Similarly, vertically oriented blazed grating regions 422, 424, 432 and 434 are formed disposed along the horizontal portions of the outer and inner features 455 and 445, respectively, which will indicate the vertical shift of the center of inner feature 445 relative to outer feature 455 due to focus aberration in the top to bottom direction of the pupil.

Figure 7:
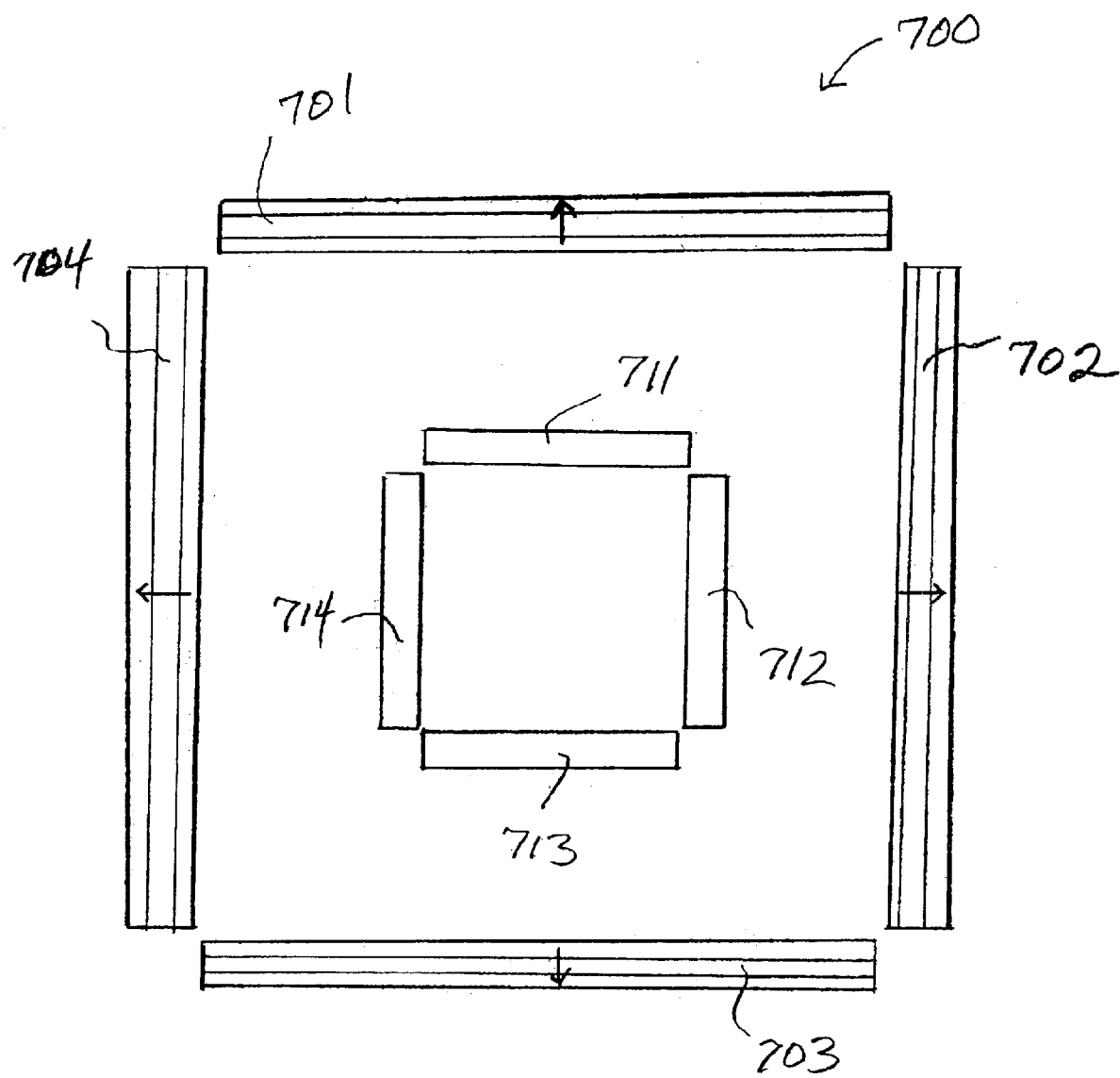
FIG. 7 illustrates a plan view of a coma-sensitive dark field test pattern in accordance with the present invention.

Another embodiment in accordance with the present invention that is sensitive to coma is illustrated in FIG. 7. The dark field box-in-box test pattern 700 includes clear outer elements 701, 702, 703 and 704 arranged in a nominally square configuration, and containing blazed gratings having directions that are oriented orthogonal to the long edges, and directed away from the inside of the pattern 700. As discussed above, other box-in-box configurations such as those illustrated in FIG. 1, may be used, as long as they are compatible with standard metrology tools. The inner clear box elements 711, 712, 713 and 714 do not have a blazed grating and thus provides 0° phase shift and diffracts only the zeroth order. In the absence of coma, the center positions of both printed boxes will overlay. In the presence of coma, the center of the printed outer box will shift relative to the center position of the inner box, providing information about the magnitude and sign of the coma vector.

Figure 8:
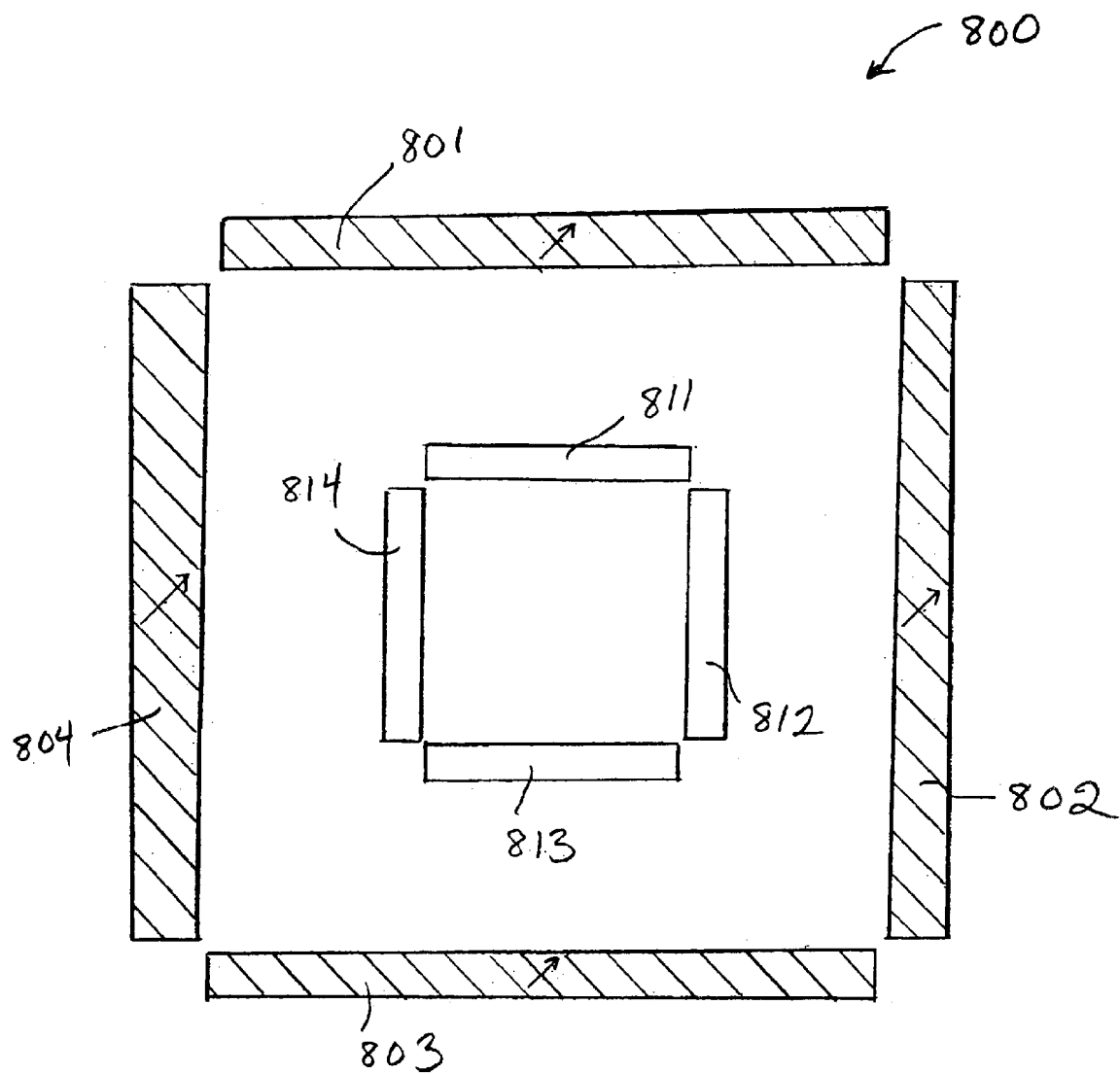
FIG. 8 illustrates a plan view of a dark field test pattern in accordance with the present invention, having a blazed grating of a single orientation.
Figure 9:
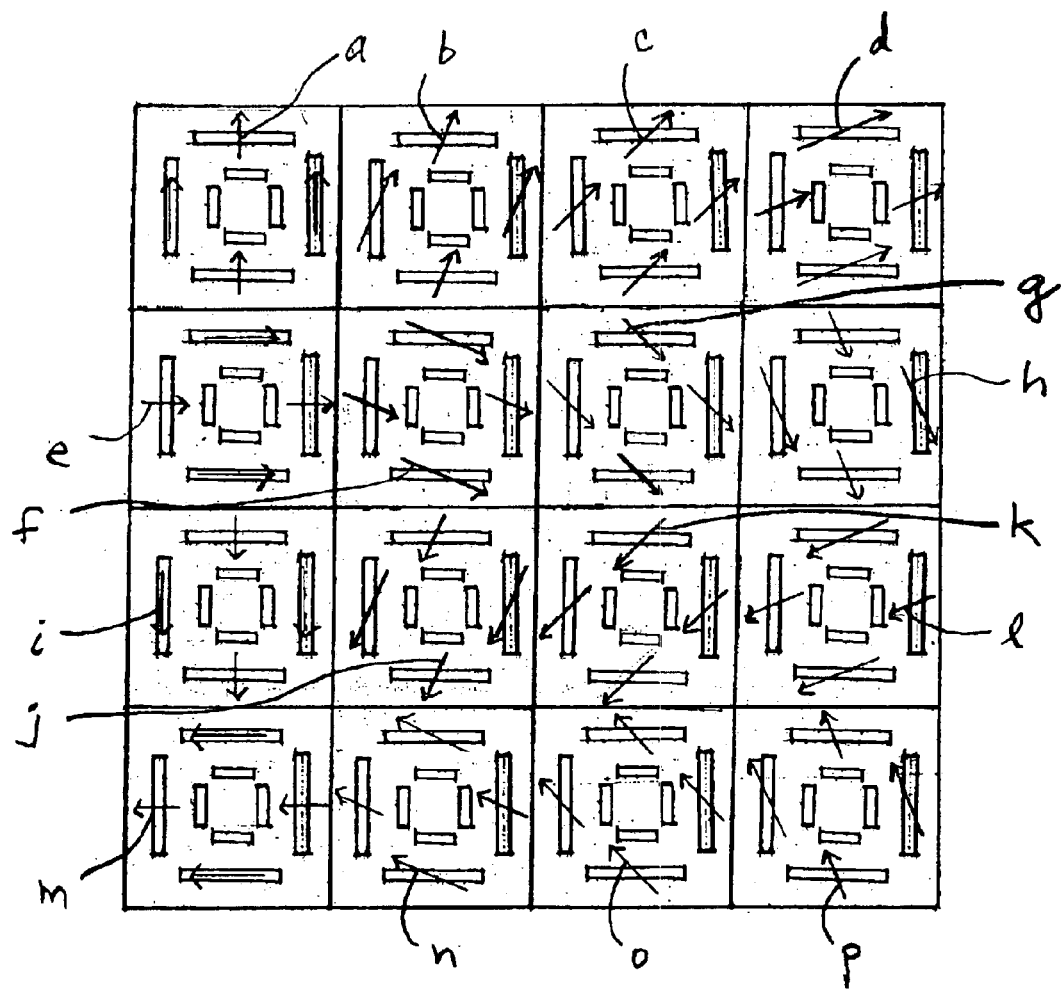
FIG. 9 illustrates a plan view of a test reticle including 16 test patterns similar to the pattern in FIG. 8, where each test pattern includes a blazed grating of a different orientation.
Figure 10:
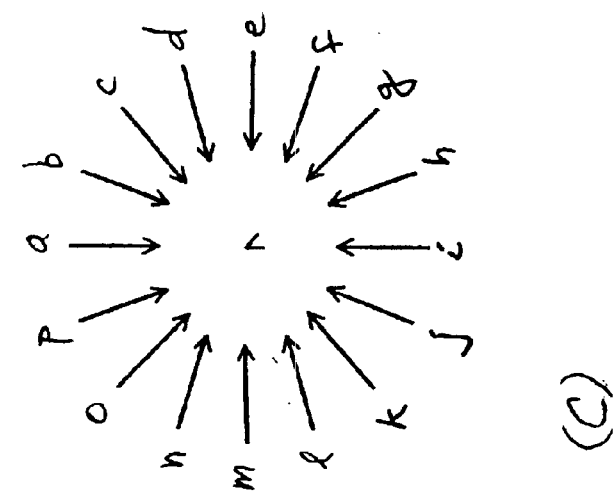
FIG. 10 illustrates the shift vectors resulting from the test reticle of FIG. 9 arranged according to the orientation of the blazed grating, showing the effect of defocus in the presence of an aberration-free lens.
Figure 10:
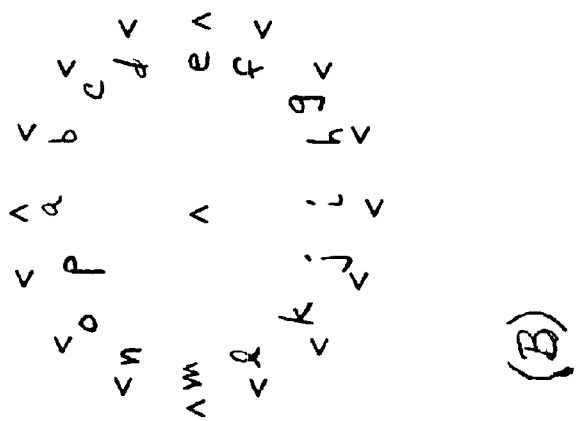
Figure 10:
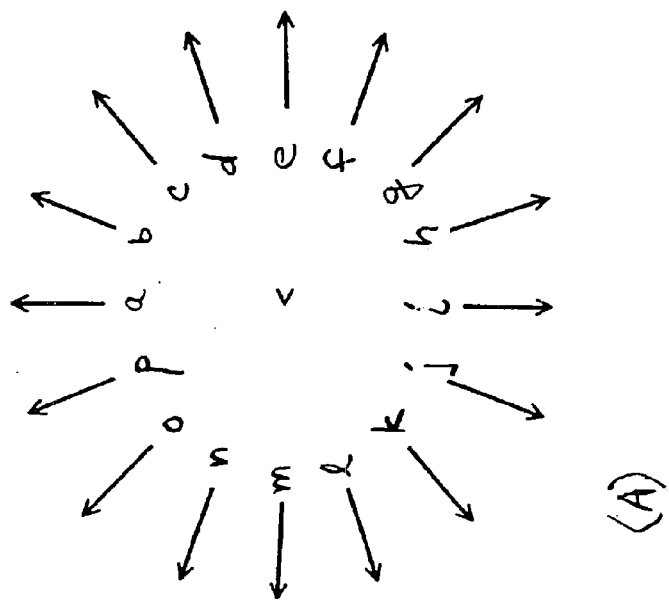
Figure 11:
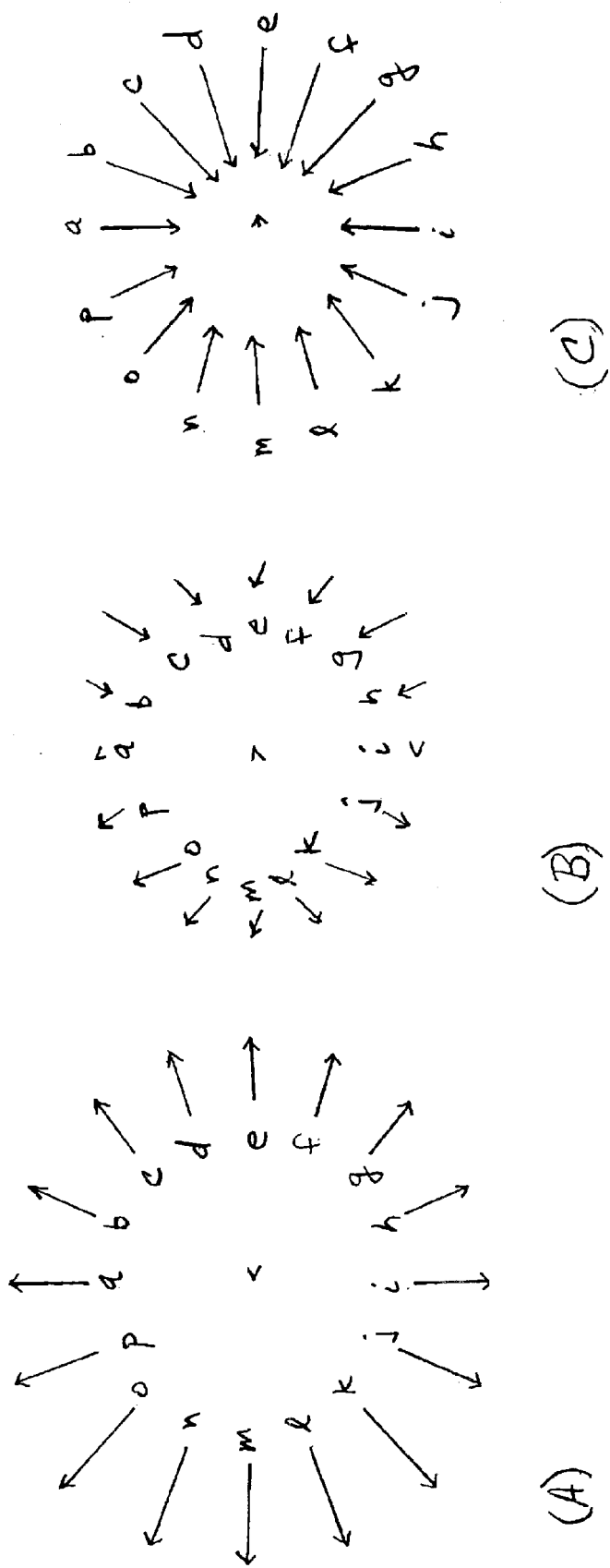
FIG. 11 illustrates the shift vectors resulting from the test reticle of FIG. 9 arranged according to the orientation of the blazed grating, showing the effect of defocus in the presence of a lens having coma aberrations.
Figure 12:
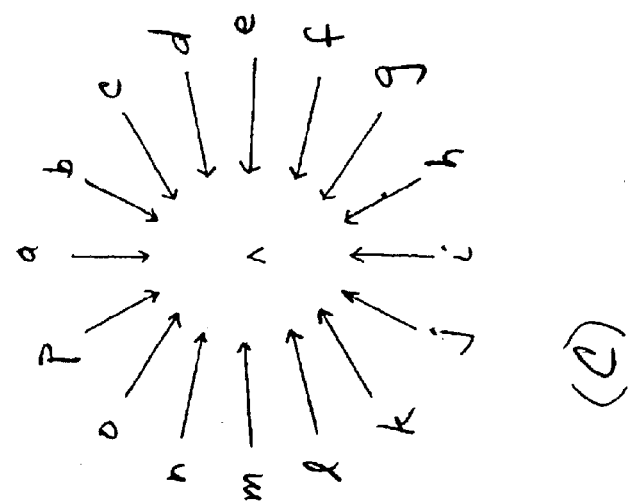
FIG. 12 illustrates the shift vectors resulting from the test reticle of FIG. 9 arranged according to the orientation of the blazed grating, showing the effect of defocus in the presence of a lens having astigmatism aberrations.
Figure 12:
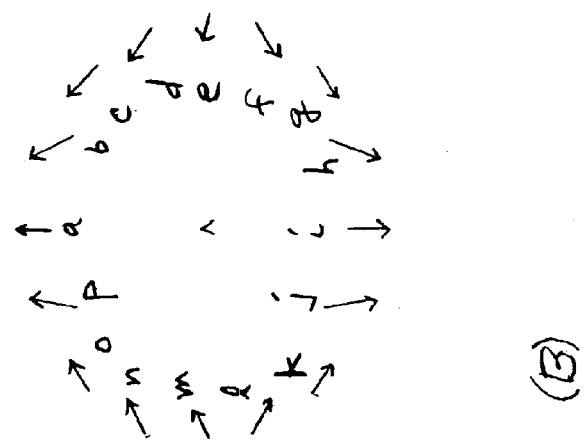
Figure 12:
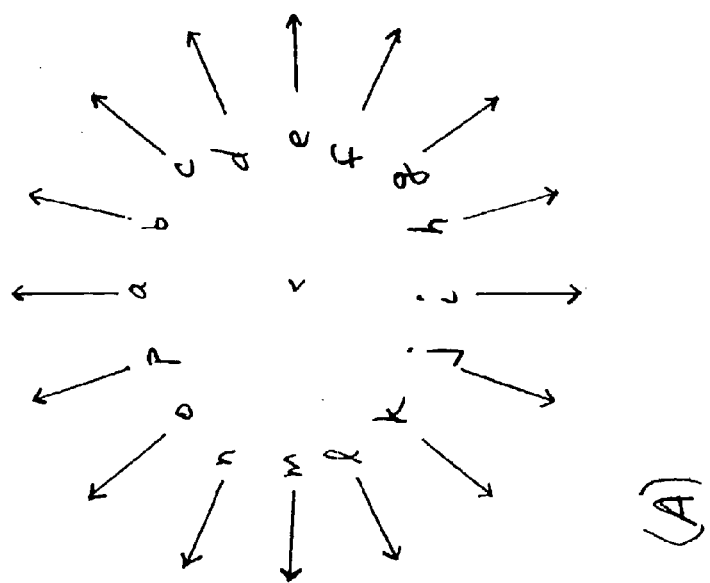

Test reticles can be formed in accordance with the present invention that can be used to determine aberrations of any order. Referring to FIG. 8, a dark field box-in-box test pattern 800 is illustrated having four outer clear elements 801, 802, 803 and 804, arranged to form a box, that include blazed gratings oriented in the direction indicated by the arrows. The test pattern 800 also includes four inner box clear elements 811, 812, 813 and 814 that do not include gratings, and transmit illumination energy with 0° phase shift. A shift of the center position of the outer box relative to the center position of the inner box provides aberration information about the portion of the pupil sampled by the blazed grating of test pattern 800. Other similar test patterns, each one having a different orientation and/or pitch, can be used to sample other portions of the pupil using one test reticle. For example, referring to FIG. 9, a set of 16 test patterns a, b, c, d, e, f, g, h, i, j, k, l, m, n, o and p, can be formed in which the outer box features each have a different orientation as indicated by the arrows, and inner box features that provide 0° phase shift. For convenience, the 16 test patterns are arranged in a 4×4 array, but any other convenient layout may be used. In the case of aberration-free optics, the shift of the outer blazed grating boxes relative to the inner box (without any grating) will have a magnitude that is uniform as a function of orientation, but the magnitude and sign will depend on the amount of defocus. This can be seen by reference to FIG. 10, where the shift vector for each test pattern is displayed on a circle at a position corresponding to the angular orientation of the grating direction of the outer box of the corresponding test pattern. Thus, at nearly perfect focus, illustrated in FIG. 10B, the centers of the inner and outer boxes do not shift relative to each other. At plus defocus, the shift vectors will point symmetrically outward (in the direction of the respective gratings) as shown in FIG. 10A. At minus defocus, the shift vectors will point symmetrically inward (in the opposite direction from the respective gratings) as shown in FIG. 10C. However, in the presence of coma aberration, the shift vectors will be asymmetric in magnitude and direction as shown in FIG. 11B. As the tool is moved through focus, the asymmetry will be magnified, but the sign of the shift will point outward for the case of plus defocus, as in FIG. 11A, or point inward for the case of minus defocus, as in FIG. 11C. Similarly, in the presence of astigmatism, a different asymmetric pattern can be observed, as shown in FIG. 12. By providing test reticles having a range of differently oriented test patterns, it is possible to combine the shift vectors to determine higher order aberration characteristics of the optical system, for example, by computing the coefficients of a series of Zernike polynomials in order to model the lens aberrations.

It will be appreciated by those skilled in the art that the above-described embodiments are only examples, and many alternatives, modifications and variations of the present invention are possible. Accordingly, the invention is intended to encompass all such alternatives, modifications and variations which fall within the scope and spirit of the invention and the following claims.

We claim:

1. A method for measuring lens aberration, the method comprising:

providing a reticle having a test pattern, said test pattern having a first feature and a second feature, said first feature comprising a blazed grating capable of forming an asymmetric pattern of illumination energy passing therethrough, said asymmetric pattern rotationally oriented in a first direction;

exposing a photosensitive material to illumination energy passing through said first and second features, wherein said blazed grating projects a single beam, to form a first feature image and a second feature image, respectively;

measuring a relative location of said first feature image with respect to said second feature image; and computing a lens aberration parameter in accordance with said relative location.

2. The method of claim 1 wherein said test pattern comprises a box-in-box pattern having an inner box and an outer box.

3. A method for measuring lens aberration, the method comprising:

providing a reticle having a test pattern, said test pattern having a first feature and a second feature, said first feature comprising a blazed grating capable of forming an asymmetric pattern of illumination energy passing therethrough, said asymmetric pattern rotationally oriented in a first direction;

exposing a photosensitive material to illumination energy passing through said first and second features to form a first feature image and a second feature image, respectively;

measuring a relative location of said first feature image with respect to said second feature image; and computing a lens aberration parameter in accordance with said relative location, wherein said test pattern comprises a box-in-box pattern having an inner box and an outer box and said first feature comprises one of said inner or outer box, and said first feature further comprises a blazed grating having a first orientation.

4. The method of claim 3 wherein said second feature comprises the remaining one of said inner or outer box, and said second feature further comprises a blazed grating having a second orientation different from said first orientation.

5. The method of claim 3 wherein said second feature comprises the remaining one of said inner or outer box.

6. A method of measuring lens aberration comprising the steps:

providing a reticle having a plurality of test patterns, each of said test patterns including and associated with a first feature and a second feature, each of said first features having a blazed grating, wherein each of said blazed gratings has an associated grating orientation different from the orientation of each of the others of said plurality of test patterns;

exposing a photosensitive material through said plurality of test patterns to form a plurality of test images, wherein each of said blazed gratings projects a single beam, each of said test images having a first image formed from said first feature and an associated second image formed from said second feature of the associated test pattern;

measuring a relative location of said first image with respect to said associated second image within each of said plurality of test images to obtain a set of relative locations wherein each of said relative locations in said set is associated with a different grating orientation; and computing a lens aberration property in accordance with said set of relative locations.

7. The method of claim 6 wherein said each of said test patterns comprises a box-in-box pattern having an inner box and an outer box.

8. A method of measuring lens aberration comprising the steps:

providing a reticle having a plurality of test patterns, wherein said each of said test patterns comprises a box-in-box pattern having an inner box and an outer box, and each of said test patterns including and associated with a first feature and a second feature, each of said first features having a blazed grating, wherein each of said blazed gratings has an associated grating orientation different from the orientation of each of the others of said plurality of test patterns;

exposing a photosensitive material through said plurality of test patterns to form a plurality of test images, each of said test images having a first image formed from said first feature an an associated second image formed from said second feature of the associated test pattern;

measuring a relative location of said first image with respect to said associated second image within each of said plurality of test images to obtain a set of relative locations wherein each of said relative locations in said set is associated with a different grating orientation; and computing a lens aberration property in accordance with said set of relative location;

wherein said first feature comprises one of said inner or outer box, and said first feature further comprises a blazed grating having a first orientation.

9. The method of claim 8 wherein said second feature comprises the remaining one of said inner or outer box.

10. A method for measuring lens aberration, the method comprising:

providing a reticle having a test pattern, said test pattern having a first feature and a second feature, said first feature comprising a blazed grating capable of forming an asymmetric pattern of illumination energy passing therethrough, said asymmetric pattern rotationally oriented in a first direction;

exposing a photosensitive material to illumination energy passing through said first and second features to form a first feature image and a second feature image, respectively;

measuring a relative location of said first feature image with respect to said second feature image; and computing a lens aberration parameter accordance with said relative location, wherein said test pattern further comprises a first vertical feature and a second vertical feature, wherein said first vertical feature comprises a first vertical blazed grating having a first horizontal orientation, and wherein said second vertical feature comprises a second vertical blazed grating having a second horizontal orientation pointing in a direction opposite that of said first horizontal orientation, said test pattern further comprising a first horizontal feature and a second horizontal feature, wherein said first horizontal feature comprises a first horizontal blazed grating having a first vertical orientation, and wherein said second horizontal feature comprises a second vertical orientation pointing in a direction opposite that of said first vertical orientation, and said exposing further comprises forming first and second vertical images associated with said first and second vertical features, respectively, and forming said first and second horizontal images associated with said first and second horizontal features, respectively, and said measuring further comprises measuring a vertical relative location and a horizontal relative location, and wherein said lens aberration property comprises focus aberration.

11. A method for measuring lens aberration, the method comprising:

providing a reticle having a test pattern, said test pattern having a first feature and a second feature, said first feature comprising a blazed grating capable of forming an asymmetric pattern of illumination energy passing therethrough, said asymmetric pattern rotationally oriented in a first direction;

exposing a photosensitive material to illumination energy passing through said first and second features to form a first feature image and a second feature image, respectively;

measuring a relative location of said first feature image with respect to said second feature image; and computing a lens aberration parameter in accordance with said relative location, wherein said test pattern further comprises a box-in-box pattern having an outer box and an inner box nested on a common center point, wherein said outer box comprises upper and lower horizontal elements and left and right vertical elements, said upper horizontal element comprising a blazed grating having an orientation pointing vertically upward, said lower horizontal element comprising a blazed grating having an orientation pointing vertically downward, said left vertical element comprising a blazed grating having an orientation pointing to the left, said right vertical element comprising a blazed grating having an orientation pointing to the right, and said inner box providing zero degree phase shift, and wherein said exposing further comprises forming outer and inner box images associated with said outer box and said inner box, respectively, and said measuring comprises determining center points of said outer and inner box images, and determining a shift of the center of said outer box image relative to the center of said inner box image, and wherein said lens aberration property comprises coma.

12. A reticle for measuring lens aberration, the reticle comprising a test pattern having a first feature and a second feature, said first feature comprising a blazed grating capable of forming an asymmetric pattern of illumination energy passing therethrough and projecting a single beam, and said asymmetric pattern rotationally oriented in a first direction.

13. The reticle of claim 12 wherein said test pattern comprises a box-in-box pattern.

14. A reticle for measuring lens aberration, the reticle comprising a plurality of test patterns, each of said test patterns including and associated with a first feature and a second feature, each of said first features comprising a blazed grating capable of forming an asymmetric pattern of illumination energy passing therethrough and projecting a single beam, said asymmetric pattern having a rotational orientation different from the orientation of each of the other of said plurality of test patterns.

15. The reticle of claim 14 wherein each of said plurality of test patterns comprises a box-in-box pattern.

16. A reticle for measuring lens aberration, the reticle comprising a test pattern having a first feature and a second feature, said first feature comprising a blazed grating capable of forming an asymmetric pattern at illumination energy passing therethrough and said asymmetric pattern rotationally oriented in a first direction, wherein said test pattern further comprises a first vertical feature and a second vertical feature, wherein said first vertical feature comprises a first vertical blazed grating having a first horizontal orientation, and wherein said second vertical feature comprises a second vertical blazed grating having a second horizontal orientation pointing in a direction opposite that of said first horizontal orientation, said test pattern further comprising a first horizontal feature and a second horizontal feature, wherein said first horizontal feature comprises a first horizontal blazed grating having a first vertical orientation, and wherein said second horizontal feature comprises a second vertical orientation pointing in a direction opposite that of said first vertical orientation.

17. A reticle for measuring lens aberration, the reticle comprising a test pattern having a first feature and a second feature, said first feature comprising a blazed grating capable of forming an asymmetric pattern of illumination energy passing therethrough and said asymmetric pattern rotationally oriented in a first direction, wherein said test pattern further comprises a box-in-box pattern having an outer box and an inner box nested on a common center point, wherein said outer box comprises upper and lower horizontal elements and left and right vertical elements, said upper horizontal element comprising a blazed grating having an orientation pointing vertically upward, said lower horizontal element comprising a blazed grating having an orientation pointing vertically downward, said left vertical element comprising a blazed grating having an orientation pointing to the left, said right vertical element comprising a blazed grating having an orientation pointing to the right, and said inner box providing zero degree phase shift.

* * * * *